United States Patent [19]

Ando

[11] Patent Number: 5,568,339
[45] Date of Patent: Oct. 22, 1996

[54] RECORDING AND/OR REPRODUCING DEVICE OPERABLE WITH A PLURALITY OF DIFFERENT SIZE CASSETTES

[75] Inventor: Masahiro Ando, Yokohama, Japan

[73] Assignee: Canon Kabushiki Kaisha, Tokyo, Japan

[21] Appl. No.: 345,411

[22] Filed: Nov. 21, 1994

[30] Foreign Application Priority Data

Nov. 30, 1993 [JP] Japan .................................. 5-299809

[51] Int. Cl.⁶ .................................................. G11B 15/00
[52] U.S. Cl. .................... 360/85; 360/94; 360/95
[58] Field of Search ...................... 360/94, 84.85, 360/95

[56] References Cited

U.S. PATENT DOCUMENTS

| | | | |
|---|---|---|---|
| 4,664,337 | 5/1987 | Shiratori | 360/94 X |
| 4,782,408 | 11/1988 | Inoue et al. | 360/94 X |
| 4,787,572 | 11/1988 | Rademacher | 360/94 X |
| 4,984,109 | 1/1991 | Yokoo | 360/94 |
| 5,082,195 | 1/1992 | Saito et al. | 360/94 X |
| 5,359,477 | 10/1994 | Yamashita | 360/85 X |

*Primary Examiner*—John H. Wolff
*Attorney, Agent, or Firm*—Fitzpatrick, Cella, Harper & Scinto

[57] ABSTRACT

A recording and/or reproducing device having reel bases which move to be adaptable to a plurality of different size cassettes. A tape is pulled out of the cassette which has been loaded into the device and is brought into contact with a head, thereby allowing the device to record and/or reproduce information on/from such a tape. The device includes a reel base movement mechanism for moving the reel bases to predetermined positions so that the reel bases are adaptable to the tape cassette to be loaded. The device also includes a lid opener for opening a lid of each tape cassette. A lid opener movement mechanism allows the lid opener to move to a predetermined position so as to be adaptable to the tape cassette. The lid opener movement mechanism is interlocked with the reel base movement mechanism. Thus, the lid opener is displaced to be adaptable to the loaded tape cassette.

14 Claims, 3 Drawing Sheets

RECORDING AND/OR REPRODUCING DEVICE OPERABLE WITH A PLURALITY OF DIFFERENT SIZE CASSETTES

BACKGROUND OF THE INVENTION

1. Field of the Invention

The present invention relates to a recording and/or reproducing device, such as a video cassette recorder (VCR), which is operable with a plurality of (at least two) types of different size tape cassettes.

2. Description of the Related Art

Conventionally, a magnetic recording and/or reproducing device which is constructed to be operable with at least two types of different size tape cassettes is provided with a lid opener for opening the lid of a tape cassette which is loaded into the device. This lid opener is used as follows. A positional reference for receiving a tape cassette is set in the device. The different size tape cassettes are offset toward the positional reference so that one end of each of the cassettes is fit to the positional reference so as to be loaded into the device. The lid opener can thus be shared to be adaptable to a plurality of tape cassettes.

Alternatively, when the above-mentioned method is not employed whereby the tape cassette is offset toward the positional reference, the different size tape cassettes are loaded into the device so that the widthwise centers of the tape cassettes coincide with each other.

In such a case, the lid opener formed of, for example, a pin member is moved to a predetermined position by an independent drive motor so as to be adaptable to the size of the loaded tape cassette.

However, such a conventional magnetic recording and/or reproducing device, particularly, a device of the type which has a tape cassette loaded therein by matching the widthwise centers of such cassettes, presents the following problems. In order to position the lid opener at the end of the lid of the tape cassette, an independent drive motor is required for suitably moving the lid opener from side to side (the widthwise direction of the tape cassette). Accordingly, such a drive motor and many parts related to the drive motor are required, thereby further increasing in complexity the mechanism and the construction of the components which are placed adjacent to the drive motor, and inevitably increasing the costs of manufacture and the resultant product.

SUMMARY OF THE INVENTION

Accordingly, in view of the above background, an object of the present invention is to provide a recording and/or reproducing device in which improvements are made in construction and cost reduction while guaranteeing correct operation.

In order to achieve the above object, according to one aspect of the present invention, there is provided a device operable with a plurality of different size cassettes so as to record and/or reproduce information on/from a tape in the cassette, comprising: (a) a head for recording and/or reproducing information on/from the tape; (b) a pair of reel bases to which the cassette is loaded; (c) a first movement mechanism for moving the pair of reel bases to predetermined positions so that the reel bases are adaptable to a cassette to be loaded; (d) a lid opening member for opening a lid of the cassette to be loaded; (e) a second movement mechanism for moving the lid opening member to a predetermined position so that the lid opening member is engageable with the cassette which has been loaded; (f) an interlocking mechanism for interlocking the second movement mechanism with the first movement mechanism, the interlocking mechanism having an interconnecting member interconnected to one of the pair of reel bases, the lid opening member engaging with the interconnecting member; and (g) a tape pulling-out member for pulling out a tape from the cassette so as to bring the tape into contact with the head after the lid opening member opens the lid.

According to another aspect of the present invention, there is provided a device operable with a plurality of different size cassettes, comprising: (a) a pair of reel bases to which the cassette is loaded; (b) a first movement mechanism for moving the pair of reel bases to predetermined positions so that the reel bases are adaptable to a cassette to be loaded; (c) a lid opening member for opening a lid of the cassette; (d) a second movement mechanism for moving the lid opening member to a predetermined position so that the lid opening member is engageable with the cassette which has been loaded; and (e) interlocking means for interlocking the second movement mechanism with the first movement mechanism.

Further objects, features and advantages of the present invention will become apparent from the following description of the preferred embodiments with reference to the attached drawings.

DETAILED DESCRIPTION OF THE PREFERRED EMBODIMENT

A preferred embodiment of a recording and/or reproducing device of the present invention will now be described with reference to FIGS. 1–4.

Figure 1:
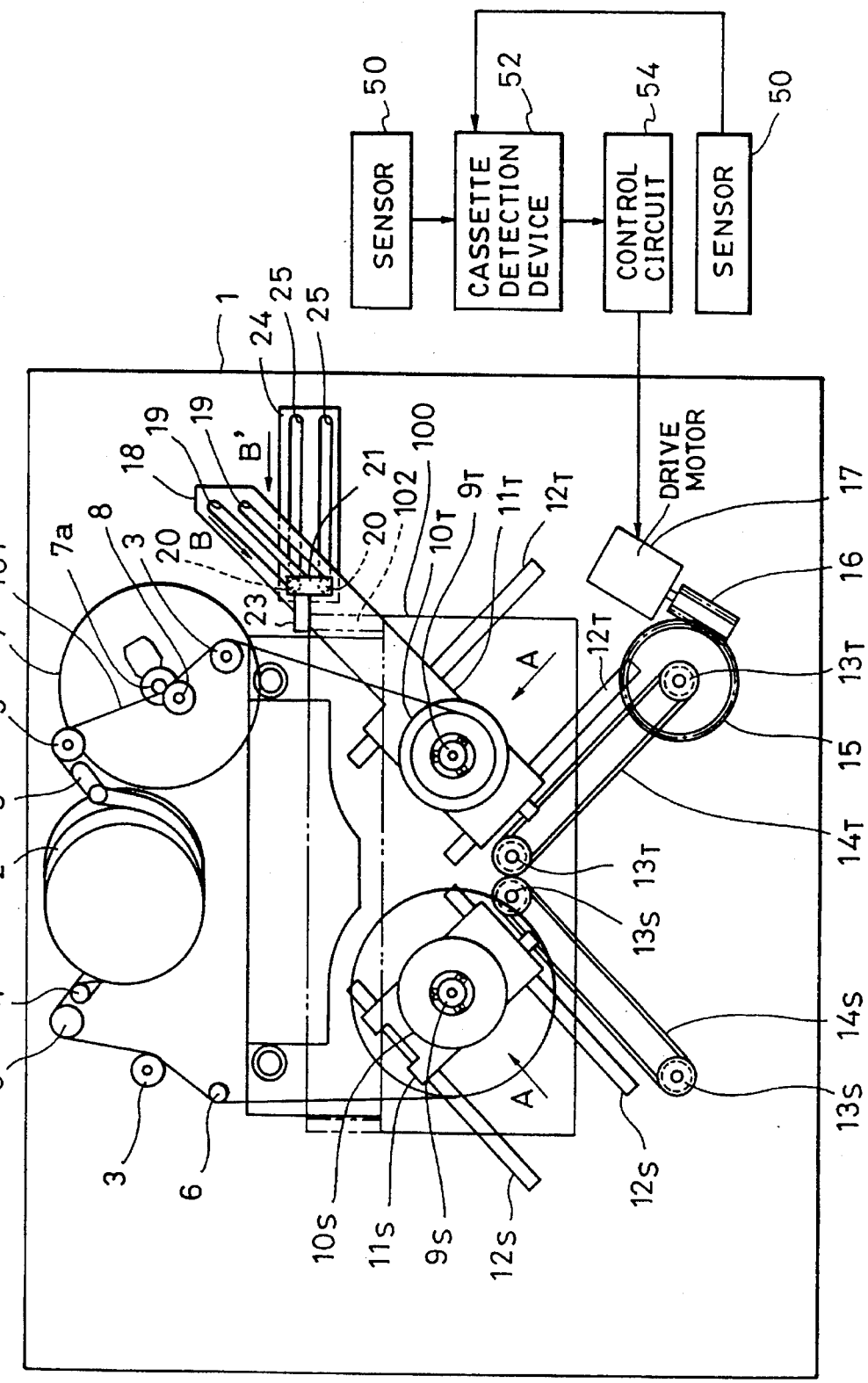
FIG. 1 is a top view of a recording and/or reproducing device according to an embodiment of the present invention when a small tape cassette is loaded into the device.
Figure 2:
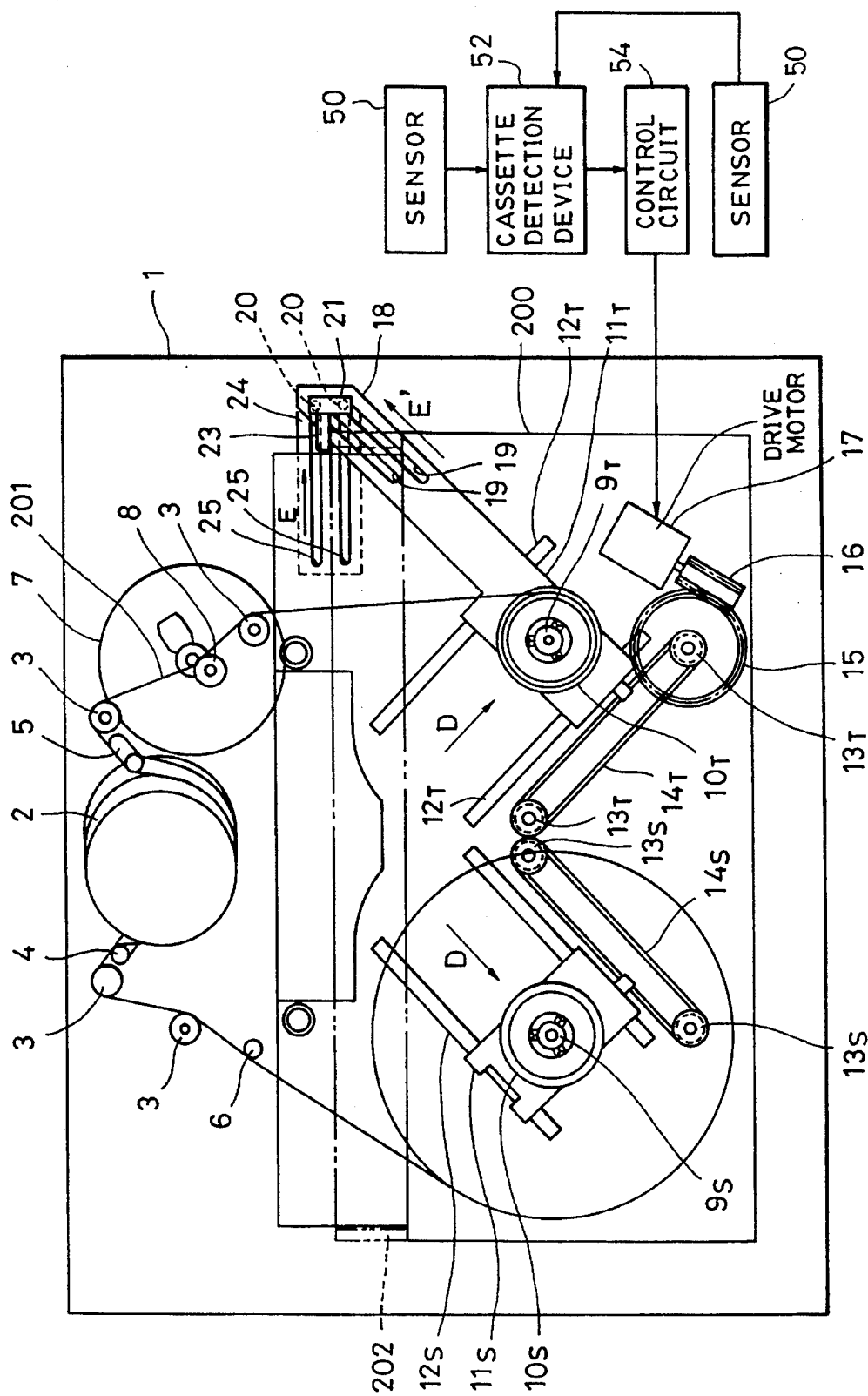
FIG. 2 is a top view of the recording and/or reproducing device of the embodiment shown in FIG. 1 when a large tape cassette is loaded into the device.

FIGS. 1 and 2 illustrate the features of the present invention in a top view representation. In this embodiment, there are two types of tape cassettes, that is, large and small cassettes, which will be loaded into the device.

FIGS. 1 and 2 show a recording and/or reproducing device of this embodiment. Such a device comprises: a mechanism chassis 1; a rotary drum 2 having a magnetic head (not shown) suitably positioned on the mechanism chassis 1; rotatable posts 3 placed for forming a tape path; a drum inlet post 4 placed at the inlet of the rotary drum 2; a drum outlet post 5 positioned at the outlet of the rotary drum 2; a tension adjustment post 6 for controlling the tape tension; a capstan motor 7; a capstan shaft 7a; and a pinch roller 8. Information is recorded and/or reproduced onto/from a magnetic tape 101 by means of the magnetic head which is fixed to the rotary drum 2.

A magnetic recording medium, that is, the magnetic tape 101 which is pulled out of a small tape cassette 100 and wound around the rotary drum 2 by way of the posts 3, 4, 5 and 6 and the pinch roller 8, is fed in a predetermined direction through the capstan shaft 7a and the pinch roller 8.

A reel shaft $9_S$ engages with a reel hub of the supply section (reference numerals of the components arranged in the supply section will be hereinafter followed by "s") of the small tape cassette 100 so as to allow the reel hub to rotate. A reel motor $10_S$ rotates the reel shaft $9_S$. A reel base $11_S$ supports the reel shaft $9_S$ and the reel motor $10_S$. A pair of guide rails $12_S$ guide the reel base $11_S$ which is slidably engaged with the guide rails $12_S$. A pair of pulleys $13_S$ are placed in the vicinity of one of the guide rails $12_S$. A belt $14_S$ is stretched taut over the pulleys $13_S$ and is connected to the reel base $11_S$ in a suitable position.

Components arranged in the take-up section (reference numerals of such components will be hereinafter followed by "T") are constructed in a manner similar to the counterparts of the supply section, that is, the reel shaft $9_S$—the belt $14_S$ which have been described above. Specifically, a reel shaft $9_T$, a reel motor $10_T$, a reel base $11_T$, a pair of guide rails $12_T$, a pair of pulleys $13_T$ and a belt $14_T$ are placed as illustrated in FIGS. 1 and 2.

Further, a gear 15 directly connected to one of the pulleys $13_T$, a worm gear 16 and a drive motor 17 for moving the reel base $11_T$ are also arranged in the take-up section. The worm gear 16 is directly connected to the drive motor 17 and is also meshed with the gear 15. The pulleys $13_S$ and $13_T$ which are placed more inward than the other pulleys (hereinafter referred to as "the inward pulleys $13_S$ and $13_T$") are engaged (for example, meshed) with each other so that the rotation torque can be transferred therebetween.

Figure 3:
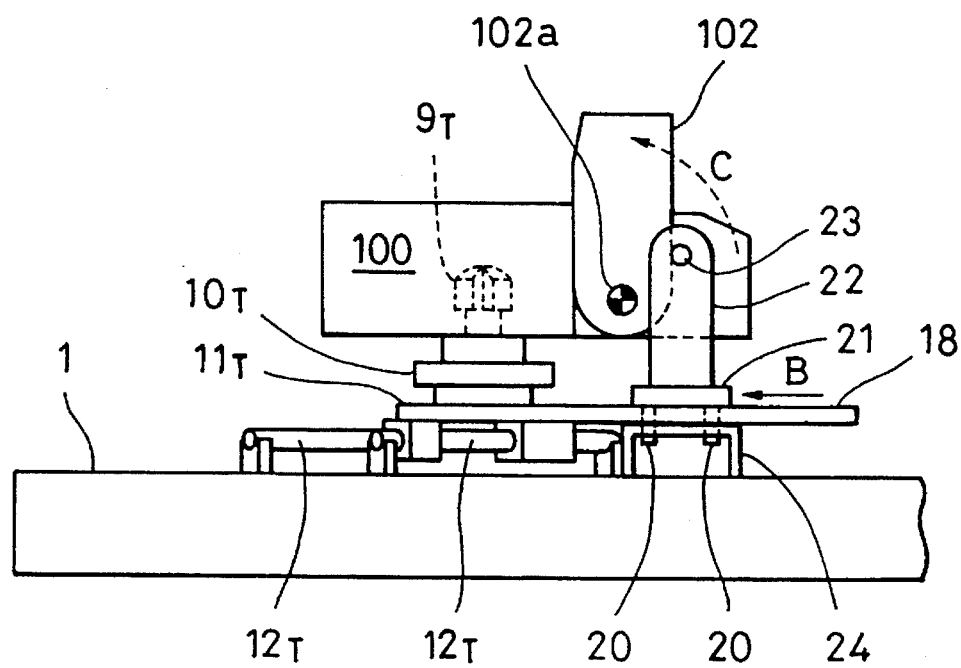
FIG. 3 is a side view of a reel base and adjacent components corresponding to the state of the device of the embodiment shown in FIG. 1.
Figure 4:
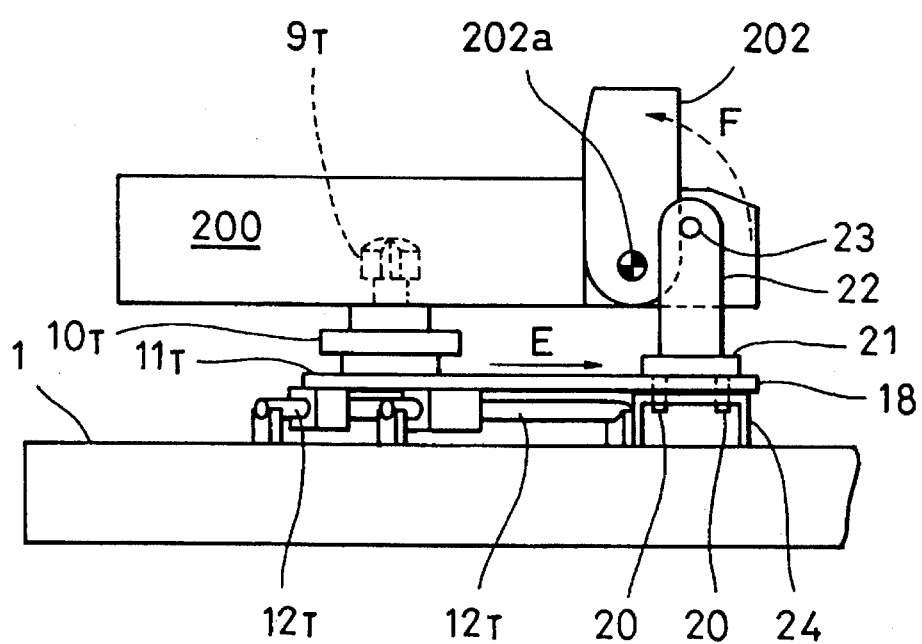
FIG. 4 is a side view of the reel base and adjacent components corresponding to the state of the device of the embodiment shown in FIG. 2.

Referring to FIGS. 3 and 4 as well as FIG. 1, the reel base $11_T$ has an arm 18 projecting from a suitable place of the reel base $11_T$ to the exterior of the mechanism chassis 1. It is preferable that the arm 18 is integrally formed with the reel base $11_T$ and extends to cross at right angles with the guide rails $12_T$. Two guide grooves 19 are longitudinally arranged along the arm 18 so that a slider 21 provided with pins 20 which slidably engage with the guide grooves 19 can reciprocates on the arm 18 along the guide grooves 19. The slider 21 preferably supports an engaging portion 23 formed of a pin member via a bracket 22 (See FIG. 3). The engaging portion 23 is allowed to suitably abut against a lid 102 of the small tape cassette 100 and a lid 202 of a large tape cassette 200 so as to form a lid opener.

Right under the arm 18, a guide base 24 is securely mounted on the mechanism chassis 1. Two guide grooves 25 are formed on the guide base 24 along the widthwise direction of the small and large tape cassettes 100 and 200. The foregoing pins 20 also move slidably along the guide grooves 25.

A description will now be given of the operation of the recording and/or reproducing device of this embodiment constructed as described above.

Before loading the tape onto the rotate drum 2, it is first determined whether the tape cassette placed in a cassette holder (not shown) is the small tape cassette 100 or the large tape cassette 200 by means of the output from two reflective optical sensors 50. Depending on the output state of such sensors 50, a cassette detection circuit 52 determines the type of cassette as follows. When both sensors 50 are ON, the cassette in question is determined to be the large tape cassette 200. On the other hand, when only one of the sensors 50 is ON, the cassette in question is determined to be the small tape cassette 100. When the cassette detection circuit 52 does not detect the output from the sensors 50 at all, it determines that no cassette has been loaded.

When the cassette detection circuit 52 determines that the small cassette 100 is loaded into the holder, the operation of the device is performed as follows. Based on this information, a control circuit 54 actuates the drive motor 17 so as to allow the worm gear 16 and the gear 15 which is meshed with the worm gear 16 to rotate in predetermined directions. The rotation of the gear 15 permits the pulleys $13_T$ to rotate and the belt $14_T$ to turn around the two pulleys $13_T$. Since the inward pulley $13_T$ engages with the inward pulley $13_S$, the belt $14_S$ of the supply section concurrently turns together with the belt $14_T$ of the take-up section. The two belts $14_S$ and $14_T$ thus turn in synchronization with each other in predetermined directions so as to respectively move the reel bases $11_S$ and $11_T$ in the directions indicated by the arrows A shown in FIG. 1.

In this manner, when the small tape cassette 100 is loaded into the device, the reel bases $11_S$ and $11_T$ move to predetermined positions so as to be adaptable to load the small tape cassette 100. The arm 18 provided for the reel base $11_T$ also moves in the direction indicated by the arrow A shown in FIG. 1. In response to the movement of the reel bases $11_S$ and $11_T$, the slider 21 slides relative to the arm 18 in the direction indicated by the arrow B along the guide grooves 19 which are engaged with the slider 21 by means of the pins 20 and also slides on the guide base 24 in the direction indicated by the arrow B' along the guide grooves 25 which are also engaged with the slider by means of pins 20.

The engaging portion 23 supported by the slider 21 is thus placed in a position to open the lid 102 of the small tape cassette 100, as is clearly seen from FIG. 3. The small tape cassette 100 is loaded into the device to allow the lid 102 to abut against the engaging portion 23 and to pivot about a pivot pin 102a in the direction indicated by the arrow C shown in FIG. 3. The lid 102 is thus opened on the front surface of the small tape cassette 100 so that the magnetic tape 101 can be pulled out of the small tape cassette 100, thereby forming a predetermined tape path through which recording and/or reproducing is performed on/from the magnetic tape 101 (See FIG. 1).

In a manner similar to the small tape cassette 100, when the cassette detection circuit 52 determines that the large tape cassette 200 placed in the cassette holder will be loaded into a predetermined position of the device, the control circuit 54 actuates the drive motor 17 to allow the worm gear 16 and the gear 15 to rotate in directions reverse to those described above when the small tape cassette 100 was loaded into the device. The rotation of the gear 15 further permits the belt $14S$ of the supply section and the belt $14T$ of the take-up section to turn around the respective pulleys $13S$ and $13T$ in synchronization with each other, thereby allowing the reel bases $11_S$ and $11T$ to move in the directions indicated by the arrows D shown in FIG. 2.

Hence, the arm 18 provided for the reel base 11T also moves in the direction indicated by the arrow D. In response to the movement of the reel base 11T, the slider 21 slides along the guide grooves 19 and 25 in the directions indicated by the arrows E and E', respectively, shown in FIG. 2.

The engaging portion 23 supported by the slider 21 is thus placed in a position to open the lid 202 of the large tape cassette 200, as is clearly seen from FIG. 4. The large tape cassette 200 is loaded into the device so as to allow the lid 202 to abut against the engaging portion 23 and to pivot about a pivot pin 202a in the direction indicated by the arrow F shown in FIG. 4. As in a manner similar to the magnetic tape 101 of the small tape cassette 100, the magnetic tape 201 can thus be pulled out of the large tape cassette 200, thereby forming a predetermined tape path through which recording and/or reproducing is performed on/from the magnetic tape 201 (See FIG. 2).

As described above, according to this embodiment, when either of the small tape cassette 100 or the large tape cassette 200 is loaded into the device, the slider 21 is permitted to slide along the guide grooves 19 and 25 particularly in cooperation with the movement of the reel base 11T. Thus, the engaging portion 23 is displaced in a predetermined position so as to abut against the lid 102 of the small tape cassette 100 or the lid 202 of the large tape cassette 200 and to open it precisely, thereby serving the function of a lid opener.

Although one embodiment of the recording and/or reproducing device has been described, it is not exclusive and the present invention may be modified, for example, as follows. When the lid opener (the engaging portion 23) is displaced in response to the reel bases $11_S$ and 11T, suitable means for example, a lever or cam means may be arranged to displace the lid opener.

Also, although the lid opener is arranged in the take-up section in this embodiment, it may be similarly arranged and constructed in the supply section, in which case, advantages similar to those described in the foregoing embodiment can be obtained.

Further, in this embodiment, the reel bases $11_S$ and 11T, and eventually, the lid opener, are moved to be adaptable to two different types of cassettes, that is, the small and large tape cassettes 100 and 200. However, this is not exclusive, and the present invention may be operable with three or more types of different size tape cassettes.

As will be clearly understood from the foregoing description of this embodiment, the present invention offers the following advantages.

When one of a plurality of types of different size tape cassettes is loaded into the device, the reel bases are moved according to the type of tape cassette, and the lid opener can thus be placed in an optimal position so as to be adaptable to the selected tape cassette by the effective use of the movement of the reel bases. In this way, the lid opener movement mechanism can be interlocked with the movement of the reel base mechanism in an effective manner, thus guaranteeing an appropriate operation of the lid opener with an extremely small number of parts. This allows a decrease in the number of parts and provides a simple construction, thereby effectively realizing a cost reduction and an improvement in reliability.

The individual components shown in outline or designated by blocks in the Drawings are all well-known in the recording/reproducing arts, and their specific construction and operation are not critical to the operation or best mode for carrying out the invention.

While the present invention has been described with reference to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A device operable with a plurality of different size cassettes so as to record and/or reproduce information on/from a tape in said cassette, said device operable with one cassette at a time, said device comprising:
   (a) a head for recording and/or reproducing information on/from the tape;
   (b) a pair of reel bases to which the cassette is loaded;
   (c) a first movement mechanism for moving said pair of reel bases to predetermined positions so that said reel bases are adaptable to a cassette to be loaded;
   (d) a lid opening member for opening a lid of the cassette to be loaded;
   (e) a second movement mechanism for moving said lid opening member to a predetermined position so that said lid opening member is engageable with the cassette which has been loaded;
   (f) an interlocking mechanism for interlocking said second movement mechanism with said first movement mechanism, said interlocking mechanism having an interconnecting member interconnected to one of said pair of reel bases, said lid opening member engaging with said interconnecting member; and
   (g) a tape pulling-out member for pulling out a tape from said cassette so as to bring said tape into contact with said head after said lid opening member opens said lid.

2. A device according to claim 1, wherein said interconnecting member causes said lid opening member to move in one direction.

3. A device according to claim 2, wherein said one direction of the movement of said lid opening member is substantially perpendicular to a direction of the movement of the reel base to which said interconnecting member is connected.

4. A device according to claim 3, wherein said second movement mechanism has a guide member for guiding said lid opening member in a direction opposite said one direction.

5. A device according to claim 1, further comprising detection means for detecting the size of the cassette to be loaded.

6. A device according to claim 5, wherein said first movement mechanism moves said reel bases upon detection of the cassette size by said detection means.

7. A device operable with a plurality of different size cassettes so as to record and/or reproduce information on/from a tape in said cassette, said device operable with one cassette at a time, said device comprising:
   (a) a pair of reel bases to which the cassette is loaded;
   (b) a first movement mechanism for moving said pair of reel bases to predetermined positions so that said reel bases are adaptable with a cassette to be loaded;
   (c) a lid opening member for opening a lid of said cassette;
   (d) a second movement mechanism for moving said lid opening member to a predetermined position so that said lid opening member is engageable with the cassette which has been loaded; and
   (e) interlocking means for interlocking said second movement mechanism with said first movement mechanism.

8. A device according to claim 7, wherein said interlocking means has an interconnecting member interconnected to one of said pair of reel bases.

9. A device according to claim 8, wherein said lid opening member is engaged with said interconnecting member.

10. A device according to claim 9, wherein said interconnecting member causes said lid opening member to move in one direction.

11. A device according to claim 10, wherein said one direction of the movement of said lid opening member is substantially perpendicular to a direction of the movement of the reel base to which said interconnecting member is connected.

12. A device according to claim 11, wherein said second movement mechanism has a guide member for guiding said lid opening member in a direction opposite said one direction.

13. A device according to claim 7, further comprising detection means for detecting the size of the cassette to be loaded.

14. A device according to claim 13, wherein said first movement mechanism moves said reel bases upon detection of the cassette size by said detection means.

* * * * *

UNITED STATES PATENT AND TRADEMARK OFFICE
CERTIFICATE OF CORRECTION

PATENT NO. : 5,568,339
DATED : October 22, 1996
INVENTOR(S) : MASAHIRO ANDO

It is certified that error appears in the above-indentified patent and that said Letters Patent is hereby corrected as shown below:

COLUMN 3

Line 42, "reciprocates" should read --reciprocate--.
Line 57, "rotate" should read --rotary--.

COLUMN 4

Line 51, "belt 14S" should read --belt $14_S$-- and "belt 14T" should read --belt $14_T$--.
Line 53, "13S and 13T" should read --$13_S$ and $13_T$--.
Line 54, "11T" should read --$11_T$--.
Line 56, "base 11T" should read --base $11_T$--.
Line 58, "base 11T," should read --base $11_T$,--.

UNITED STATES PATENT AND TRADEMARK OFFICE
CERTIFICATE OF CORRECTION

PATENT NO. : 5,568,339  Page 2 of 2
DATED : October 22, 1996
INVENTOR(S) :
MASAHIRO ANDO It is certified that error appears in the above-indentified patent and that said Letters Patent is hereby corrected as shown below:

COLUMN 5

Line 10, "base 11T." should read --base $11_T$.--.
Line 20, "11T," should read --$11_T$,--.
Line 29, "11T," should read --$11_T$,--

Signed and Sealed this

Eleventh Day of March, 1997

Attest:

BRUCE LEHMAN

Attesting Officer   Commissioner of Patents and Trademarks